Sept. 4, 1962  L. CLARK  3,052,621
HOT WATER OIL SAND SEPARATION PROCESS
Filed Oct. 19, 1959
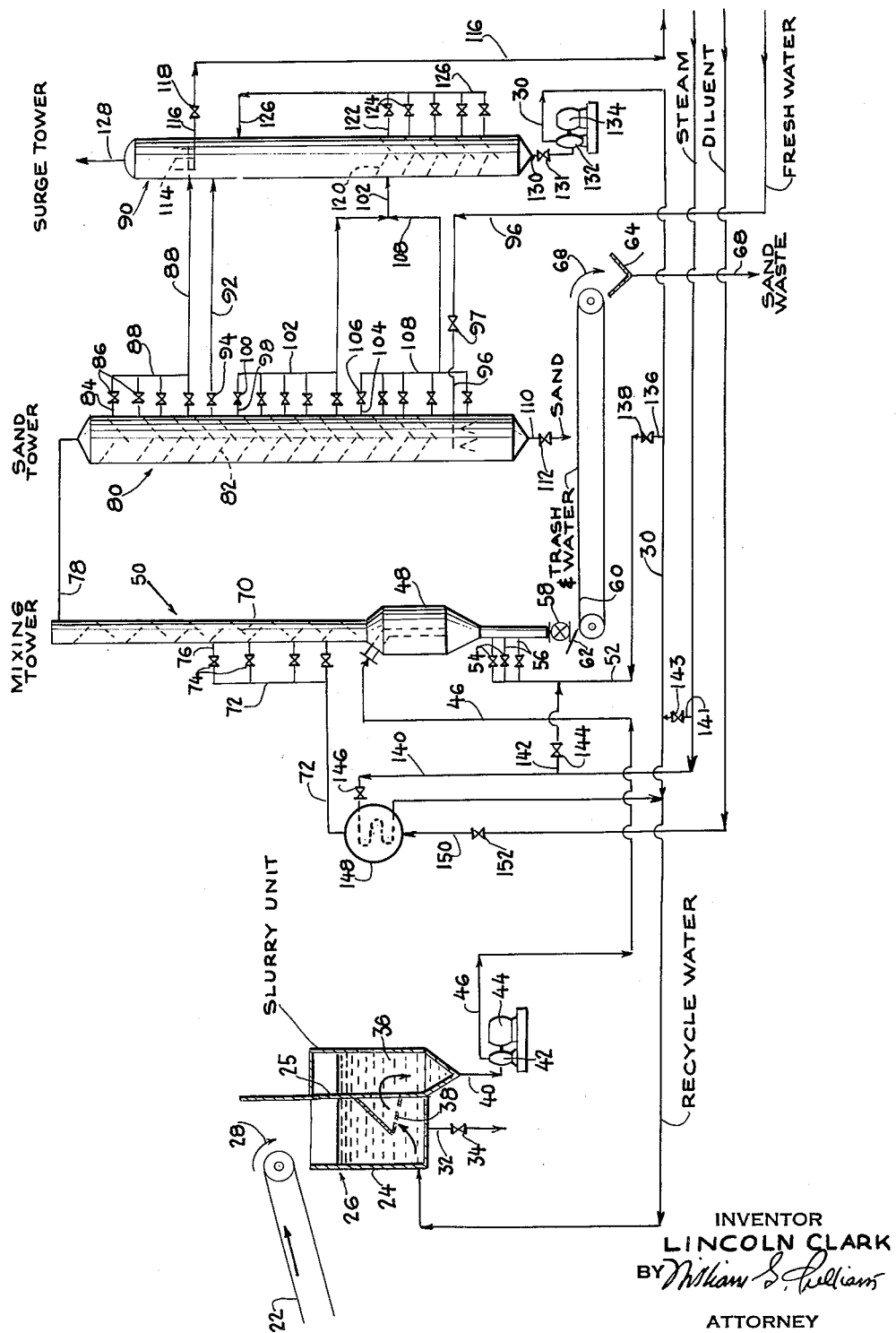
INVENTOR
LINCOLN CLARK
BY *William S. Williams*
ATTORNEY

United States Patent Office 3,052,621
Patented Sept. 4, 1962

3,052,621
HOT WATER OIL SAND SEPARATION PROCESS
Lincoln Clark, Balboa, Calif., assignor to Cities Service Research and Development Company, New York, N.Y., a corporation of New Jersey
Filed Oct. 19, 1959, Ser. No. 842,186
5 Claims. (Cl. 208—11)

This invention relates to an improved process for the separation of sand from a mixture containing the same, hydrocarbon oil and water and more especially relates to the separation of crude oil from bituminous sand containing the same.

Large deposits of bituminous sand are found in various localities throughout the world. The term "bituminous sand" is used herein to describe those materials commonly referred to as oil sands, tar sands and the like. One of the most extensive deposits of bituminous sands occurs for instance in the Athabasca district of the Province of Alberta, Canada and extends for many thousands of square miles in thicknesses ranging up to more than 200 feet.

Various methods have been proposed previously for separating crude oil from bituminous sands such as the Alberta tar sands but none of these methods has met with any substantial success. Since the crude oil obtainable from this type of bituminous sand is a relatively heavy, viscous material having high tar content and relatively low commercial value in comparison with other crude oils, a successful commercial process must involve relatively little expense in the separation of the crude oil from the bituminous sands. Operating costs of previously conceived methods for separating the oil from bituminous sands have been sufficiently high so as to discharge commercial exploitation.

It is an object of the present invention to provide an improved process for separating oil from bituminous sands containing the same.

It is another object of the invention to provide an improved process for separating sand from mixtures containing the same, hydrocarbon oil and water.

It is another object of the invention to provide an improved process for separating sand from bituminous sand containing the same and hydrocarbon oil.

According to a preferred embodiment of the present invention, crude hydrocarbon oil is separated from bituminous sand containing the same by the process which comprises mixing said sand with sufficient water to form a slurry, introducing the slurry into the lower portion of a mixing tower, and adding additional water to the slurry in the lower portion of the mixing tower. The slurry, together with the added water, is then flowed upwardly through the mixing tower and hydrocarbon diluent is introduced at an intermediate point in the mixing tower. The mixture of crude oil, sand, hydrocarbon diluent and water then passes to the upper portion of a sand separation tower in which it is allowed to flow downwardly over a series of downwardly slanted baffles. Due to its lower specific gravity oil tends to collect under the baffles and an oil-rich mixture of oil and water is drawn off from under the upper portions of the baffles. This oil-rich mixture may be passed to a surge tower as described below or may be treated by conventional methods such as flotation for separation of oil and water. The remainder of the mixture in the sand separation tower preferably continues downwardly through the tower and is contacted in the lower portion of the tower with a countercurrent flow of water introduced into the lower portion of the tower. This water serves to strip the sand and stripped sand may be withdrawn from the bottom of the tower. Slanted baffles similar to those in the upper portion of the sand separation tower are preferably contained also in the lower and intermediate portions of the tower and stripping water containing small amounts of oil may be withdrawn from under the baffles at the lower part of the tower while water containing slightly greater quantities of oil may be withdrawn from under baffles in the intermediate part of the tower.

The oil-rich mixture of oil and water from the upper portion of the sand separation tower is preferably passed to the upper portion of a surge tower located at a slightly lower elevation than the separation tower. The mixtures of oil and water withdrawn from the intermediate and lower portions of the separation tower may then be passed to an intermediate portion of the surge tower. The use of a surge tower in this manner serves to minimize the effects of variations in flow rates, etc., and to insure a uniform pressure drop in removing liquid streams from the separation tower. By maintaining a uniform, relatively low pressure drop across the valves or outlets through which liquid is removed from the separation tower the possibility of forming undesirable emulsions is substantially reduced.

The lower portion of the surge tower preferably contains slanting baffles similar to those used in the sand separation tower and oil tends to become trapped under these baffles as the oil water mixtures from the intermediate and lower portions of the sand separation tower move towards the bottom of the surge tower. Such oil may be withdrawn from under the upper portions of these baffles and allowed to pass through a by-pass conduit to the upper portion of the surge tower. A product mixture of oil and water may then be withdrawn from the upper portion of the surge tower for recovery of oil by suitable processes such as flotation while a stream of water is withdrawn from the lower portion of the surge tower. Part or all of this water is preferably recycled for forming the original slurry with the bituminous sand as described above.

For a better understanding of the invention reference should be had to the accompanying drawing which is a somewhat diagrammatic illustration in which equipment is shown in elevation of a suitable arrangement of apparatus for separating oil from bituminous sand in accordance with the invention.

In the drawing bituminous sand is discharged from a suitable source such as a conveyor belt 22 into suitable slurrying apparatus such as a mixing tank 24 of a slurry unit 26 as indicated by an arrow 28. The bituminous sand treated according to this invention contains crude oil and sand. Such bituminous sands usually include at least some silt in addition to the coarser sand particles. For purposes of this application silt may be defined as solids particles which pass through a 200 mesh screen and may include for instance extremely fine sand particles as well as clay or other solids present in the form of particles of such size. Such silt frequently constitutes between about 1 and about 20 weight percent of the total solids content of the bituminous sands while crude oil frequently constitutes between about 10 and about 20 weight percent of the bituminous sands. In addition such bituminous sands frequently contain between about 1 and about 15 weight percent water. Compositions of suitable bituminous sands may, of course, vary over even wider ranges and minor amounts of other ingredients may also be present.

The tar sand introduced into the mixing tank 24 is mixed with water introduced through a conduit 30 to form a transportable slurry. The water introduced through conduit 30 may be fresh water but is preferably recycled water recovered from the process as described below. The mixing of the tar sand and water in the mixing tank 24 may be accomplished by any suitable means such as by the use of conventional mixing rods or paddles but is preferably accomplished by jets of injected water. The slurry of water and sand formed in the mixing tank 24 may then be allowed to pass through a suitable seive or grizzly 38 into a suitable container such as a slurry tank 36 which may conveniently form a part of the slurry unit 26 and be separated from the mixing tank 24 only by a suitable partition such as 25. The screen 38 may have openings of suitable size as about two or three inches and is designed only to reject larger stones or lumps of sand too big to be readily pumped. Such stones or lumps may be withdrawn from the tank 24 through a conduit 32 and valve 34. The slurry is withdrawn from the slurry tank 36 through a conduit 40 and passed through a conduit 46 by suitable means such a slurry pump 42 driven by a motor 44. The slurry from the conduit 46 enters the lower portion of a mixing tower 50 and is contacted therein with additional water introduced, for instance, through a conduit 52. The water from conduit 52 may be injected at one or more points through suitable valve and conduits such as valves 54 and conduits 56. This water may be fresh water but is preferably recycled water obtained as described below. Water is added from conduit 52 in sufficient quantity to cause the slurry introduced through conduit 46 to be flowed upwardly through the tower 50. The intermediate and upper portions of the tower 50 are preferably provided with downwardly slanting baffles such as 70 or other suitable means for insuring complete mixing of ingredients as the mixture of slurry and water flows upwardly.

By contacting water with the bituminous sand both in the mixing tank 24 and in the mixing tower 50 the crude oil which originally is adhered to particles of sand may be disengaged from the sand particles. To assist in such separation hydrocarbon diluent is preferably introduced into an intermediate portion of the tower 50. Such hydrocarbon diluent, which may be obtained through a conduit 72 as described below, is preferably injected at a plurality of points through suitable means such as valves 74 and conduits 76. Such hydrocarbon diluent should have a specific gravity substantially less than 1.0. Suitable diluents are, for instance, petroleum oils having gravities between about 30 and about 60° API. The use of hydrocarbon diluent has the effect of reducing the viscosity and specific gravity of the oil in contact with the sand particles by dissolving the original oil content of the bituminous sand. This facilitates separation of sand particles from the mixture.

Particles of rock, unbroken lumps of sand and other trash settle to the bottom of the mixer trash tower 50 and may be withdrawn together with some water through a valve 58 and directed by a baffle 62 onto a conveyor belt 60 from which the same may be discharged into a hopper 64 as indicated by an arrow 66 and carried to a suitable disposal point as by conduit 68.

From the upper portion of the mixing tower 50 a mixture of sand, hydrocarbon oil and water is passed to the upper portion of a cascade sand tower 80 through a conduit 78. The oil in this mixture comprises hydrocarbon diluent containing dissolved crude oil and the mixture may, of course, contain silt in addition to the coarser sand particles. The upper portion of the sand tower 80 is preferably provided with a series of downwardly slanting baffles such as 82 and the mixture introduced into the top of the tower through the conduit 78 is allowed to flow downwardly over these baffles. Due to the downwardly slanding nature of the baffles 82 oil tends to collect under the upper portions of these baffles and such oil may be withdrawn through suitable conduits such as 84 and valves 86. An excess of liquid is preferably withdrawn through the conduits 84 and valves 86 so that the liquid thus withdrawn consists of an oil-rich mixture of oil and water and such mixture may also contain silt. The mixture withdrawn through the conduits 84 and valves 86 may be removed through a conduit 88 and is preferably passed to a surge tower 90 to be described in greater detail below. A further mixture of oil and water may be withdrawn through conduit 92 and valve 94 and passed to the surge tower. The remainder of the mixture of sand, hydrocarbon oil and water continues to flow downwardly from the upper portion to the intermediate and lower portions of the sand tower 80. In the intermediate and lower portions of the tower 80 the downwardly flowing mixture is preferably contacted countercurrently with an upward flowing stream of water introduced into the lower portion of the tower as through a conduit 96 and valve 97. The water introduced through the conduit 96 serves to strip the sand of remaining hydrocarbons and relatively clean stripped sand may then be withdrawn from the bottom of the tower 80 as through a conduit 110 and valve 112. Such sand is conveniently discharged from the conduit 110 onto the conveyor belt 60 for disposal along with the trash and water from the tower 50 as described above.

It is preferred that the water introduced into the lower portion of the separation tower be fresh make-up water although recycle water may be used. By introducing make-up into the system in this manner, the heat content of the sand will be transferred to the stripping water, thereby improving the thermal efficiency of the process.

The intermediate and lower portions of the tower 80 as well as the upper portion thereof are preferably provided with downwardly slanted baffles such as 82. Such baffles not only aid in contacting the downwardly flowing mixture with the upwardly flowing water but also permit water and oil which is relatively free of sand to accumulate under the upper portions of the baffles. Thus a mixture of water and oil may be withdrawn from under the baffles in the intermediate portion of the tower 80 as by conduits 98 and nozzles 100 and from under the baffles in the lower portion of the tower as by conduits 104 and valves 106. The mixtures withdrawn from nearer the bottom portion of the tower, of course, contain relatively smaller quantites of oil than the mixtures withdrawn from relatively higher portions of the tower. These mixtures are conveniently withdrawn through conduits 102 and 108 and are passed through conduit 102 to an intermediate portion of the surge tower 90. The surge tower 90 serves to maintain a relatively low and constant pressure drop across the valves such as 86, 100 and 106 through which liquids are withdrawn from the sand tower 80. By maintaining such a relatively low pressure drop across these valves the formation of undesirable emulsions in the liquid streams being withdrawn from the tower 80 is substantially avoided.

The lower portion of the surge tower 90 is preferably provided with downwardly slanted baffles such as 120 through which the mixture of oil and water introduced through the conduit 102 is allowed to flow in a downward direction. Due to the lower specific gravity of the oil it tends to collect under the upper portions of these baffles and such trapped oil may be withdrawn as through conduits 122 and valves 124 and allowed to pass via a conduit 126 to the upper portion of the surge tower. The streams of oil and water introduced into the upper portion of the surge tower 90 through the conduits 88 and 92 and enriched by the oil introduced into the upper portion of the tower through the conduit 126 may be withdrawn through a conduit 116 and valve 118. Such withdrawn oil and water product may then be treated in any suitable manner such as by conventional flotation methods for the separation of oil product from water and from any silt which may be present. Any gaseous material which accumulates in the surge tower 90 is conveniently withdrawn through a conduit 128. Water may be withdrawn from the lower portion of the surge tower 90 through a conduit 130 and valve 131 and recycled through the conduit 30 by a pump 132 driven by a motor 134. A portion of the recycled water in the conduit 30 may be passed through a conduit 136 and valve 138 to the conduit 52 for injection into the mixing tower 50 as described above while the remainder of the recycled water continues through the conduit 30 to the mixing tank 24 for mixing with bituminous sand to form a slurry as described above.

Hydrocarbon diluent which is introduced into the mixing tower 50 from the conduit 72 as described above may be introduced into the process through a conduit 150 and valve 152 and such hydrocarbon diluent may be heated in a diluent heater 148 prior to being passed through the conduit 72. In the heater 148 the hydrocarbon diluent may be contacted with a suitable heat exchange medium such as steam introduced through a conduit 140 and valve 146 in order to heat the same to a desired temperature for introduction into the tower 50. If desired, a portion of the steam entering through conduit 140 may be allowed to pass through a conduit 142 and valve 144 for direct injection into the recycle water in conduit 52 in order to heat the same. Additional steam from the conduit 140 may be passed through a conduit 141 and valve 143 for injection into the recycle water in the conduit 30 in order to heat the same sufficiently to raise the temperature of the slurry formed in mixing tank 24 to the desired level.

In removing sand from mixtures of bituminous sand, water and hydrocarbon diluent in accordance with the invention, the mixture is preferably maintained at a temperature between about 160 and about 200° F., more usually between about 170 and about 190° F. Substantanially lower temperatures are not desirable because of increased difficulty in obtaining proper mixing of water and bituminous sand whereas substantially higher temperatures are normally avoided in order to avoid unnecessary consumption of heat in the process. The materials may, of course, be heated by any suitable means but injection of steam into recycle water as disclosed above is preferred for convenience. Temperatures on the order of those mentioned above also facilitate proper separation of the crude oil from the sand particles with the aid of the added hydrocarbon diluent.

It is contemplated that the slurry unit 26 may be portable in nature to facilitate transportation of bituminous sands from the field to the remainder of the separation unit described above. The slurry unit 26 may thus conveniently be moved about with the mining equipment used to feed the bituminous sands onto the conveyor belt 22 and may be connected to the remainder of the equipment described above only by the conduits 30 and 46 which may, if desired, take the form of pipe lines or flexible hose.

EXAMPLE

The following specific example illustrates a practical application of the present invention using the process described and shown in the drawing.

An Alberta tar sand having the properties shown in Table I below is fed to the mixing tank 24 by the conveyor belt 22 at the rate of 41 tons per hour (86 gallons per minute).

Table I

Composition and properties of bituminous sand feed:

| | | |
|---|---|---|
| Water | wt. percent | 2.1 |
| Mineral matter | do | 82.8 |
| Crude oil | do | 15.1 |
| Density | lb./ft | 125 |

Composition of crude oil:

| | | |
|---|---|---|
| Carbon | wt. percent | 83.3 |
| Hydrogen | do | 10.4 |
| Sulfur | do | 4.7 |
| Nitrogen | do | 0.4 |
| Oxygen | do | 1.2 |
| Carbon/hydrogen ratio | | 8.0 |
| Specific gravity at 77° F | | 1.007 |

Sieve analysis of mineral matter after ignition—Retained on:

| | | |
|---|---|---|
| 50 mesh | wt. percent | 18.3 |
| 80 mesh | do | 49.9 |
| 100 mesh | do | 13.3 |
| 200 mesh | do | 11.0 |
| Passing 200 mesh | do | 7.5 |

Water is added to the mixing tank 24 through the conduit 30 at the rate of 235 gallons per minute (g.p.m.) and at a temperature of 207° F. A slurry of water and bituminous sand is passed through the conduit 46 to the mixing tower 50 at a temperature of 180° F. and at the rate of 321 g.p.m. Hydrocarbon diluent is introduced through the conduit 150 at a pressure of 30 p.s.i.g., a temperature of 32° F. and at the rate of 58 g.p.m. This diluent is a gasoline fraction having a gravity of 60° API. Prior to being introduced into the tower 50 this diluent is heated to a temperature of 180° F. in the heater 148. Steam is introduced through the conduit 140 at the rate of 7,000 pounds per hour and at a pressure of 60 p.s.i.g. 5,000 pounds per hour of this steam is passed from the conduit 140 through the conduit 141 and valve 143 to the conduit 30 to heat the recycle water therein while 260 pounds per hour is passed through the conduit 142 and valve 144 to the conduit 52 to heat the recycle water in the conduit 52. The remainder of the steam continues through the conduit 140 to the heater 148 where it is used to heat the slurry passing from the conduit 150 to the conduit 72. Recycle water is passed to the mixing tower 50 through the conduit 52 at the rate of 30 g.p.m. and this recycle water is heated to a temperature of 180° F. by the injection of the steam from conduit 142. Trash and water is withdrawn from the bottom of the mixing tower 50 through the valve 58 at the rate of 5 g.p.m. while the mixture of hydrocarbon oil, water and sand is withdrawn from the upper portion of the mixing tower 50 through the conduit 78 at a temperature of 180° F. and at the rate of 404 g.p.m. The mixtures of oil and water passing through the conduits 88 and 92 from the sand tower 80 to the surge tower 90 are at a temperature of 180° F. and 162 g.p.m. of these mixtures are passed through conduits 88 and 92. Stripping water is introduced into the sand tower 80 through the conduit 96 at the rate of 107 g.p.m. and at a temperature of 100° F. A mixture of oil and water is passed from the tower 80 to the tower 90 through the conduit 102 at a temperature of 180° F. and at the rate of 102 g.p.m. Conduit 102 also carries 153 g.p.m. of water containing some oil which is withdrawn from the tower 80 and passed through the conduit 108 at a temperature of 153° F. 94 g.p.m. of sand waste is withdrawn from the tower 80 through the valve 112 and conduit 110 at a temperature of 110° F. Oil and water product is withdrawn from the upper portion of the surge tower 90 through the valve 118 and conduit 116 at a temperature of 180° F. and at the rate of 162 g.p.m. while recycle water is withdrawn from the bottom of the tower through the conduit 130 and valve 131 at a temperature of 163° F. and at the rate of 255 g.p.m.

While the invention has been described in detail with respect to a preferred embodiment thereof it will be understood by those skilled in the art various changes and modifications may be made without departing from the spirit and scope of the invention and it is intended to cover all such changes and modifications in the appended claims.

I claim:
1. The process for recovering hydrocarbon oil from bituminous sand containing the same which comprises:
Mixing said bituminous sand with water to form a slurry;
Passing said slurry to the lower portion of a vertically elongated mixing zone;
Introducing water into the lower portion of said mixing zone;

Introducing hydrocarbon diluent into an intermediate portion of said mixing zone;

Flowing said slurry together with said added water and hydrocarbon diluent upwardly through said mixing zone while directing said upward flow alternately in different horizontal directions to thoroughly mix said slurry, added water and hydrocarbon diluent to thereby remove crude oil from particles of sand and dissolve same in said hydrocarbon diluent;

Allowing relatively large pieces of trash to settle to the bottom of said mixing zone and withdrawing same therefrom;

Withdrawing a mixture containing hydrocarbon oil, sand and water from the upper portion of said mixing zone and passing same to the upper portion of a vertically elongated sand separation zone;

Allowing said mixture of hydrocarbon oil, sand and water to flow downwardly through the upper portion of said sand separation zone while directing such downward flow alternately in different horizontal direction;

Collecting hydrocarbon liquid at a plurality of collection points spaced vertically along the upper portion of said sand separation zone;

Withdrawing an oil-rich mixture of oil and water from said collection points and passing same through a relatively small, uniform pressure drop to the upper portion of a vertically elongated surge zone positioned at a slightly lower elevation than said sand separation zone;

Allowing the remainder of said mixture of hydrocarbon oil, sand and water to flow downwardly through the intermediate and lower portions of said sand separation zone while directing such downward flow alternately in different horizontal directions;

Flowing water upwardly through the lower and intermediate portions of said sand separation zone generally counter current to the flow of sand therein;

Collecting hydrocarbon liquid at a plurality of collection points spaced vertically along the intermediate and lower portions of said sand separation zone;

Withdrawing mixtures of water and oil from collection points in the intermediate and lower portions of said sand separation zone and passing same through a relatively small, uniform pressure drop to an intermediate portion of said surge zone;

Allowing the mixture introduced into the intermediate portion of the surge zone to flow downwardly through the lower portion of said surge zone while directing such downward flow alternately in different horizontal directions;

Collecting hydrocarbon liquid at a plurality of points spaced vertically along the lower portion of said surge zone;

Withdrawing hydrocarbon liquid from collection points in the lower portion of said surge zone and passing same to the upper portion of said surge zone;

Withdrawing an oil rich mixture of oil and water from the upper portion of said surge zone; and Withdrawing water from the bottom of said surge zone and recycling same for mixing with fresh bituminous sand to form a slurry as described above.

2. The process for recovering hydrocarbon oil from bituminous sand containing the same which comprises:

Mixing said bituminous sand with water to form a slurry;

Passing said slurry to the lower portion of a vertically elongated mixing zone;

Introducing water into the lower portion of said mixing zone;

Introducing hydrocarbon diluent into an intermediate portion of said mixing zone;

Flowing said slurry together with said added water and hydrocarbon diluent upwardly through said mixing zone while directing said upward flow alternately in different horizontal directions to thoroughly mix said slurry, added water and hydrocarbon diluent to thereby remove crude oil from particles of sand and dissolve same in said hydrocarbon diluent;

Withdrawing a mixture containing hydrocarbon oil, sand and water from the upper portion of said mixing zone and passing same to the upper portion of a vertically elongated sand separation zone;

Allowing said mixture of hydrocarbon oil, sand and water to flow downwardly through the upper portion of said sand separation zone while directing such downward flow alternately in different horizontal directions;

Collecting hydrocarbon liquid at a plurality of collection points spaced vertically along the upper portion of said separation zone;

Withdrawing an oil rich mixture of oil and water from said collection points and passing same through a relatively small, uniform pressure drop to the upper portion of a vertically elongated surge zone;

Allowing the remainder of said mixture of hydrocarbon oil, sand and water to flow downwardly through the intermediate and lower portions of said sand separation zone while directing such downward flow alternately in different horizontal directions;

Flowing water upwardly through the lower and intermediate portions of said sand separation zone generally counter current to the flow of sand therein;

Collecting hydrocarbon liquid at a plurality of collection points spaced vertically along the intermediate and lower portions of said sand separation zone;

Withdrawing mixtures of water and oil from collection points in the intermediate and lower portions of said sand separation zone and passing same through a relatively small, uniform pressure drop to an intermediate portion of said surge zone;

Withdrawing an oil rich mixture of oil and water from the upper portion of said surge zone; and Withdrawing water from the lower portion of said surge zone.

3. The process according to claim 2 in which the mixing zone, sand separation zone and surge zone are maintained at a temperature of at least about 160° F.

4. The process for recovering hydrocarbon oil and water from a mixture containing the same and sand which comprises:

Introducing said mixture into the upper portion of a vertically elongated sand separation zone;

Allowing said mixture of hydrocarbon oil, sand and water to flow downwardly through the upper portion of said sand separation zone while directing such downward flow alternately in different horizontal directions;

Collecting hydrocarbon liquid at a plurality of collection points spaced vertically along the upper portion of said sand separating zone;

Withdrawing an oil rich mixture of oil and water from said collection points and passing same through a relatively small, uniform pressure drop to the upper portion of a surge zone;

Allowing the remainder of said mixture of hydrocarbon oil, sand and water to flow downwardly through the intermediate and lower portions of said sand separation zone while directing such downward flow alternately in different horizontal directions;

Flowing water upwardly through the lower and intermediate portions of said sand separation zone generally counter current to the flow of sand therein to strip hydrocarbon oil from said sand;

Withdrawing stripped sand from the lower portion of said sand separation zone;

Collecting hydrocarbon liquid at a plurality of collection points spaced vertically along the intermediate and lower portions of said sand separation zone;

Withdrawing mixtures of water and oil relatively lean in oil from collection points in the intermediate and lower portions of said sand separation zone and passing same through a relatively small, uniform pressure drop to an intermediate portion of said surge zone;

Withdrawing an oil rich mixture of oil and water from the upper portion of said surge zone; and Withdrawing water from the lower portion of said surge zone.

5. The process for recovering hydrocarbon oil and water from a mixture containing the same and sand which comprises:

Introducing said mixture into the upper portion of a vertically elongated sand separation zone;

Allowing said mixture of hydrocarbon oil, sand and water to flow downwardly through the upper portion of said sand separation zone while directing such downward flow alternately in different horizontal directions;

Collecting hydrocarbon liquid at a plurality of collection points spaced vertically along the upper portion of said sand separation zone;

Withdrawing an oil rich mixture of oil and water from said collection points and passing same through a relatively small, uniform pressure drop to the upper portion of a vertically elongated surge zone positioned at a slightly lower elevation then said sand separation zone;

Allowing the remainder of said mixture of hydrocarbon oil, sand and water to flow downwardly through the intermediate and lower portions of said sand separation zone while directing such downwad flow alternately in different horizontal directions;

Flowing water upwardly through the lower and intermediate portions of said sand separation zone generally counter current to the flow of sand therein to strip hydrocarbon oil from said sand;

Withdrawing stripped sand from the lower portion of said sand separation zone;

Collecting hydrocarbon liquid at a plurality of collection points spaced vertically along the intermediate and lower portions of said sand separation zone;

Withdrawing mixtures of water and oil relatively lean in oil from collection points in the intermediate and lower portions of said sand separation zone and passing same through a relatively small, uniform pressure drop to an intermediate portion of said surge zone;

Allowing the mixture introduced into the intermediate portion of the surge zone to flow downwardly through the lower portion of said surge zone while directing such downward flow alternately in different horizontal directions;

Collecting hydrocarbon liquid at a plurality of points spaced vertically along the lower portion of said surge zone;

Withdrawing hydrocarbon liquid from collection points in the lower portion of said surge zone and passing same to the upper portion of said surge zone;

Withdrawing an oil rich mixture of oil and water from the upper portion of said surge zone; and Withdrawing water from the lower portion of said surge zone.

References Cited in the file of this patent

UNITED STATES PATENTS

| | | |
|---|---|---|
| 2,885,339 | Coulson et al. | May 5, 1959 |
| 2,924,565 | Stegemeier et al. | Feb. 9, 1960 |
| 2,924,566 | Vaell et al. | Feb. 9, 1960 |
| 3,005,554 | Kuntz | Oct. 24, 1961 |